US008691328B2

(12) United States Patent
Yang et al.

(10) Patent No.: US 8,691,328 B2
(45) Date of Patent: Apr. 8, 2014

(54) PROCESS FOR PRODUCTION OF ALUMINUM COMPLEX COMPRISING SINTERED POROUS ALUMINUM BODY

(75) Inventors: Ji-bin Yang, Okegawa (JP); Koji Hoshino, Kitamoto (JP); Kenji Orito, Kitamoto (JP); Hitoshi Maruyama, Kitamoto (JP)

(73) Assignee: Mitsubishi Materials Corporation, Tokyo (JP)

(*) Notice: Subject to any disclaimer, the term of this patent is extended or adjusted under 35 U.S.C. 154(b) by 163 days.

(21) Appl. No.: 13/375,589

(22) PCT Filed: Mar. 30, 2010

(86) PCT No.: PCT/JP2010/002311
§ 371 (c)(1),
(2), (4) Date: Feb. 17, 2012

(87) PCT Pub. No.: WO2010/140290
PCT Pub. Date: Dec. 9, 2010

(65) Prior Publication Data
US 2012/0135142 A1    May 31, 2012

(30) Foreign Application Priority Data
Jun. 4, 2009   (JP) .................................. 2009-135021

(51) Int. Cl.
*B05D 5/12* (2006.01)
(52) U.S. Cl.
USPC ............................ 427/115; 427/243; 427/247
(58) Field of Classification Search
USPC ........................................ 427/115, 243, 247
See application file for complete search history.

(56) References Cited

U.S. PATENT DOCUMENTS 4,331,477 A * 5/1982 Kubo et al. ...................... 75/228

5,151,246 A    9/1992 Baumeister et al.
(Continued)

FOREIGN PATENT DOCUMENTS

| CN | 88103047 A | 12/1988 |
| CN | 1133894 A | 10/1996 |

(Continued)

OTHER PUBLICATIONS

Office Action dated Dec. 5, 2012, issued for the Chinese patent application No. 201080014886.5 and English translation thereof.
(Continued)

*Primary Examiner* — Brian K Talbot
(74) *Attorney, Agent, or Firm* — Edwards Wildman Palmer LLP

(57) ABSTRACT

This method for producing an aluminum composite including porous sintered aluminum, includes: mixing aluminum powder with a sintering aid powder containing either one or both of titanium and titanium hydride to obtain a raw aluminum mixed powder; adding and mixing a water-soluble resin binder, water, a plasticizer containing at least one selected from polyhydric alcohols, ethers, and esters, and a water-insoluble hydrocarbon-based organic solvent containing five to eight carbon atoms into the raw aluminum mixed powder to obtain a viscous composition; shape-forming the viscous composition on an aluminum foil or an aluminum plate and causing the viscous composition to foam to obtain a formed object prior to sintering; and heating the formed object prior to sintering in a non-oxidizing atmosphere to obtain an aluminum composite which includes porous sintered aluminum integrally joined onto the aluminum foil or the aluminum plate, wherein when a temperature at which the raw aluminum mixed powder starts to melt is expressed as Tm (° C.), then a temperature T (° C.) of the heating fulfills Tm-10 (° C.)≤T≤685 (° C.).

5 Claims, 8 Drawing Sheets

(56) References Cited

U.S. PATENT DOCUMENTS

| | | | |
|---|---|---|---|
| 6,852,273 B2* | 2/2005 | Ivanov et al. | 419/5 |
| 6,926,969 B2* | 8/2005 | Bohm et al. | 428/566 |
| 2003/0115730 A1 | 6/2003 | Ament et al. | |
| 2004/0146736 A1* | 7/2004 | Ivanov et al. | 428/609 |
| 2004/0191107 A1 | 9/2004 | Ishikawa et al. | |
| 2010/0032616 A1 | 2/2010 | Wada et al. | |

FOREIGN PATENT DOCUMENTS

| | | | | | |
|---|---|---|---|---|---|
| CN | 1144728 | A | | 3/1997 | |
| CN | 1162499 | A | | 10/1997 | |
| CN | 1464804 | A | | 12/2003 | |
| JP | 56-077301 | A | | 6/1981 | |
| JP | 61-048566 | B2 | | 10/1986 | |
| JP | 04-231403 | A | | 8/1992 | |
| JP | 08-209265 | A | | 8/1996 | |
| JP | 08-325661 | A | | 12/1996 | |
| JP | 08-339941 | A | | 12/1996 | |
| JP | 09072015 | A | * | 3/1997 | E04B 1/80 |
| JP | 09143511 | A | * | 6/1997 | B22F 3/11 |
| JP | 2000-297334 | A | | 10/2000 | |
| JP | 2002266003 | A | * | 9/2002 | B22F 3/02 |
| JP | 2003-520292 | A | | 7/2003 | |
| JP | 2004-035961 | A | | 2/2004 | |
| JP | 3535282 | B2 | | 6/2004 | |
| JP | 2004-218035 | A | | 8/2004 | |
| JP | 3591055 | B2 | | 9/2004 | |
| JP | 2005-290493 | A | | 10/2005 | |
| JP | 2005-294013 | A | | 10/2005 | |
| JP | 2007-046089 | A | | 2/2007 | |
| JP | 2007-100176 | A | | 4/2007 | |
| JP | 2007-238971 | A | | 9/2007 | |
| JP | 2008-106294 | A | | 5/2008 | |
| JP | 2009-043536 | A | | 2/2009 | |
| JP | 2010-236082 | A | | 10/2010 | |
| JP | 2010-255089 | A | | 11/2010 | |

OTHER PUBLICATIONS

Search Report dated Feb. 22, 2013, included in the Office Action dated Mar. 4, 2013, issued for the Chinese patent application No. 201080034965.2 and English translation of the Search Report.

N.D. Karsu et al. "Foaming behavior of Ti6Al4V particle-added aluminum powder compacts," J Mater Sci vol. 44, Nov. 6, 2008, pp. 1494-1505.

Office Action dated Apr. 5, 2013, issued for the Korean patent application No. 10-2011-7022557 and English translation thereof.

Office Action dated Apr. 5, 2013, issued for the Korean patent application No. 10-2011-7022553 and English translation thereof.

Office Action mailed Jul. 9, 2013, issued for the Japanese patent application No. 2009-186616 and English translation thereof.

Office Action mailed Jul. 9, 2013, issued for the Japanese patent application No. 2009-186621 and English translation thereof.

International Search Report dated May 25, 2010, issued for PCT/JP2010/002311 and English translation thereof.

Office Action mailed Jul. 30, 2013, issued for the Japanese patent application No. 2009-135021 and English translation thereof.

International Search Report dated May 25, 2010, issued for PCT/JP2010/002298.

International Search Report dated May 25, 2010, issued for PCT/JP2010/002308.

Office Action mailed Jun. 7, 2013, issued for the Chinese patent application No. 201080014014.9 and English partial translation of the Search Report.

* cited by examiner

SURFACE OF
ALUMINUM FOIL

SURFACE OF
FOAMED ALUMINUM

PROCESS FOR PRODUCTION OF ALUMINUM COMPLEX COMPRISING SINTERED POROUS ALUMINUM BODY

TECHNICAL FIELD

The present invention relates to a method for producing an aluminum composite in which porous sintered aluminum is integrally formed on an aluminum foil or an aluminum plate, which is particularly suitable for use in current collectors for a lithium-ion secondary batter and an electrical double layer capacitor, a radiator plate for an LED, heatsink, a radiator, and the like.

The present application claims priority on Japanese Patent Application No. 2009-135021 filed on Jun. 4, 2009, the content of which is incorporated herein by reference.

BACKGROUND ART

Recently, aluminum foil has generally been used as a current collector for positive electrodes of a lithium-ion battery and an electrical double layer capacitor. In addition, such a battery and a capacitor have been used in electrical vehicles and the like in recent years, and the electrode with the current collector in the battery and the capacitor has been required to have a higher output and a higher energy density with the broadening of the usage purposes. As described in Patent Documents 1 and 2, porous aluminum body which includes open pores having a three-dimensional network structure has been known as a current collector for an electrode.

As a method for producing this porous aluminum body, a foam-melting method has been known as disclosed in Patent Document 3. In this foam-melting method, a thickener is added to a melted aluminum so as to increase the viscosity, and then titanium hydride as a foaming agent is added thereto. While foaming the melted aluminum by utilizing hydrogen gas generated in a thermal decomposition reaction of the titanium hydride, the melted aluminum is solidified. However, foamed aluminum obtained by this method includes large closed pores having sizes of several millimeters.

There are other methods, and the following method is exemplified as a second method. Aluminum is pressed into a casting mold having a core of sponge urethane, and a hollow cavity formed after burning off the urethane is filled with the aluminum. Thereby, foamed aluminum having a sponge skeleton is obtained. According to this method, foamed aluminum is obtained which includes open pores having pore diameters that fulfill 40 PPI or smaller, that is, 40 cells or less per inch (pore diameters of about 600 µm or larger).

The following method is exemplified as a third method. As disclosed in Patent Document 4, aluminum alloy is infiltrated into a reinforcing material made of hollow ceramics by the pressure infiltration method; and thereby, foamed aluminum is obtained which includes closed pores having pore diameters of 500 µm or smaller in accordance with the dimension of the reinforcing material.

The following method is exemplified as a fourth method. As disclosed in Patent Document 5, a mixed powder of AlSi alloy powder and $TiH_2$ powder is sandwiched between aluminum plate materials, and the mixed powder is heated and rolled in such a state. Thereby, aluminum is foamed due to the decomposition of the $TiH_2$ powder. The foamed aluminum obtained by this method includes pores having large pore diameters of several millimeters.

The following method is exemplified as a fifth method. As disclosed in Patent Document 6, aluminum is mixed with metal of which eutectic temperature with aluminum is lower than the melting point of aluminum, and the mixture is heated at a temperature which is higher than the eutectic temperature and lower than the melting point of aluminum. Foamed aluminum obtained by this method has a porosity of about 40% which is low, although the pore diameters can be reduced by this method. Therefore, in the case where the foamed aluminum is used as a current collector, an amount of cathode active material or anode active material infiltrated into the pores of the foamed aluminum is small, and the desired high output and high energy density cannot be achieved.

Accordingly, among the aforementioned foam-melting method and the second to fifth methods, the second method in which aluminum is pressed into a casting mold having a core of sponge urethane, is employed as a method of producing foamed aluminum including fine open pores which can attain the high output and high energy density.

However, even in the second method, it is necessary to use sponge urethane having a fine microporous structure in order to further reduce the pore diameters of the open pores. In the case where such a sponge urethane is used, the flow of aluminum worsens; and thereby, aluminum cannot be press-filled into the hollow, or the casting pressure becomes excessively high. Therefore, it is difficult to manufacture foamed aluminum which includes pores having pore diameters that fulfill smaller than 40 PPI.

A slurry foaming method is disclosed in Patent Document 7 as a method for producing foamed metal which has a high porosity and includes open pores having small diameters and uniform dimensions, in which a plurality of fine open pores are uniformly arranged. In the slurry foaming method, foamable slurry containing metal powder and a foaming agent is foamed, and dried. Thereafter, the foamed and dried slurry is sintered. According to this method, if a raw material powder which can be sintered is prepared, it is possible to easily manufacture foamed metal which has a high porosity and includes open pores having uniform dimensions and arbitrary pore diameters that fulfill about 10 PPI to about 500 PPI, that is, within a pore diameter range of 2.5 mm to 50 µm. Here, the slurry foaming method means a method for producing foamed metal in which foaming is conducted by containing the foaming agent as described above or foaming is conducted by injecting gas and stirring, and the foamable slurry as described above is sintered in the foamed state.

However, conventionally, it is difficult to manufacture foamed aluminum by the slurry foaming method.

The reason is as follows. In the slurry foaming method, metal powder is sintered by free sintering which is performed without applying stress such as a compression stress or the like; and thereby, foamed metal is obtained. However, the surface of aluminum powder is covered with dense aluminum oxide film having a thickness of several nanometers to several tens of nanometers, and this aluminum oxide film inhibits the sintering regardless of being solid phase sintering or a liquid phase sintering. Therefore, it is difficult to proceed sintering by the free sintering; and as a result, uniform foamed aluminum cannot be obtained by the slurry foaming method.

In addition, a method can be exemplified which employs a combination of the slurry foaming method and the aforementioned fifth method, as a method for sintering the aluminum powder by the free sintering. According to this method, copper powder is prepared as a metal whose eutectic temperature with aluminum is lower than the melting point of aluminum, and the copper powder and a foaming agent are mixed with aluminum. Then the mixture is heated and sintered at a temperature which is higher than the eutectic temperature and lower than the melting point of aluminum. Thereby, foamed aluminum is obtained. However, liquid droplets of aluminum ooze out of the surface, and the liquid droplets are solidified; and as a result, a plurality of aluminum lumps having semispherical shapes are formed. In particular, in the case where the foamed aluminum has a thin plate shape, the formation of the aluminum lumps occurs remarkably as shown in FIG. 9, and it is not possible to manufacture desired uniform foamed aluminum.

Thus, the present inventors previously proposed a method for producing porous sintered aluminum, by which it is possible to obtain uniform foamed aluminum which has a high porosity and includes fine open pores having uniform dimensions and pore diameters of 40 PPI or greater, namely, a size of 600 μm or smaller, in Japanese Patent Application No. 2009-82498.

On the other hand, with regard to the porous sintered aluminum obtained by the above-described production method, in the case where the thickness is thin, the mechanical strength is deteriorated, and in addition, openings are formed on both surfaces. Therefore, it is necessary to integrally join a metal foil or a metal plate in order to secure the mechanical strength or shield one surface when the porous sintered aluminum is used in current collectors for a lithium-ion secondary batter and an electrical double layer capacitor, a radiator plate for an LED, heatsink, a radiator, and the like, or when the porous sintered aluminum is used in an application where a fluid flows mainly in the surface direction. As a result, the number of production processes increases, and there are problems in that more time and efforts are needed for the production processes because the method for joining this type of aluminum material is restricted.

PRIOR ART DOCUMENT

Patent Documents

[Patent Document 1] Japanese Patent No. 3591055
[Patent Document 2] Japanese Unexamined Patent Application, Publication No. 2009-43536
[Patent Document 3] Japanese Unexamined Patent Application, Publication No. H08-209265
[Patent Document 4] Japanese Unexamined Patent Application, Publication No. 2007-238971
[Patent Document 5] Published Japanese Translation No. 2003-520292 of the PCT International Publication
[Patent Document 6] Japanese Examined Patent Application, Publication No. S61-48566
[Patent Document 7] Japanese Patent No. 3535282

DISCLOSURE OF THE INVENTION

Problems to be Solved by the Invention

The present invention is made in view of the above circumstances, and the present invention aims to provide a method for producing an aluminum composite, by which it is possible to easily obtain at low cost a composite in which uniform porous sintered aluminum is integrated with an aluminum foil or an aluminum plate, and the uniform porous sintered aluminum has a high porosity and includes open pores having pore diameters of 600 μm or smaller and uniform dimensions.

Means for Solving the Problems

The present inventors found that there were conditions under which it was possible to perform sintering even by free sintering without generating lumps of liquid droplets if an aluminum powder was mixed with a sintering aid powder containing titanium and the mixture was heated and sintered at a temperature within a predetermined range, and the present inventors completed the present invention relating to porous sintered aluminum. When the porous sintered aluminum is produced, a sintering aid powder containing titanium and/or titanium hydride is mixed with aluminum powder to prepare a viscous composition before foaming, and the viscous composition is shape-formed and caused to foam on an aluminum foil or an aluminum plate. Then, heating and sintering is conducted at a temperature within a predetermined temperature range. The present inventors found that it was possible to produce an aluminum composite, in which the porous sintered aluminum was integrated with the aluminum foil or the like, by this method.

The present invention was made based on the above finding.

The method for producing an aluminum composite including porous sintered aluminum of the present invention includes: mixing aluminum powder with a sintering aid powder containing either one or both of titanium and titanium hydride to obtain a raw aluminum mixed powder; adding and mixing a water-soluble resin binder, water, a plasticizer containing at least one selected from polyhydric alcohols, ethers, and esters, and a water-insoluble hydrocarbon-based organic solvent containing five to eight carbon atoms into the raw aluminum mixed powder to obtain a viscous composition; shape-forming the viscous composition on an aluminum foil or an aluminum plate and causing the viscous composition to foam to obtain a formed object prior to sintering; and heating the formed object prior to sintering in a non-oxidizing atmosphere to obtain an aluminum composite which includes porous sintered aluminum integrally joined onto the aluminum foil or the aluminum plate, wherein when a temperature at which the raw aluminum mixed powder starts to melt is expressed as Tm (° C.), then a temperature T (° C.) of the heating fulfills Tm-10 (° C.)≤T≤685 (° C.).

Here, the non-oxidizing atmosphere means an atmosphere in which raw aluminum mixed powder is not oxidized, and examples thereof include an inert atmosphere, and a reducing atmosphere. In addition, the aforementioned heating temperature is not the temperature of the raw aluminum mixed powder, that is, the heating temperature means not the measured reaction temperature of the raw aluminum mixed powder but the holding temperature of the surrounding around the raw aluminum mixed powder.

In the method for producing an aluminum composite including porous sintered aluminum of the present invention, an average particle diameter of the aluminum powder may be in a range of 2 to 200 μm.

When an average particle diameter of the sintering aid powder is expressed as r (μm), and a mixing ratio of the sintering aid powder is expressed as W (% by mass), then r and W may fulfill 1 (μm)≤r≤30 (μm), 1 (% by mass)≤W≤20 (% by mass), and 0.1≤W/r≤2.

The water-soluble resin binder may be contained at a content in a range of 0.5% to 7% of a quantity (mass) of the raw aluminum mixed powder.

Surfactant may be added to the raw aluminum mixed powder at a content in a range of 0.02 to 3% of a quantity (mass) of the raw aluminum mixed powder.

Effects of the Invention

In accordance with the method for producing an aluminum composite including porous sintered aluminum of the present invention, the aluminum powder is mixed with the sintering aid powder containing titanium and/or titanium hydride to obtain the raw aluminum mixed powder, a water-soluble resin binder, water, a plasticizer, and a water-insoluble hydrocarbon-based organic solvent are added and mixed into the raw aluminum mixed powder. The mixture is shape-formed on an aluminum foil or an aluminum plate, and the mixture is caused to foam to obtain a formed object prior to sintering. Then, the formed object prior to sintering is heated and sintered at a temperature within a predetermined temperature range in a non-oxidizing atmosphere. Thereby, it is possible to obtain an aluminum composite including porous sintered aluminum integrally joined onto the aluminum foil or the aluminum plate.

Here, the reason that the heating temperature is limited to not less than Tm-10 (° C.) is because the temperature at which the aluminum powder contained in the raw aluminum mixed powder starts to react with the sintering aid powder containing titanium is Tm-10 (° C.). The melting point of aluminum is described as Tm because industrially used aluminum contains impurities such as iron and silicon and the melting point thereof becomes lower than 660° C., which is the melting point of pure aluminum. On the other hand, the reason that the heating temperature is limited to 685° C. or lower is because aluminum lumps having liquid droplet shapes are generated in the sintered body in the case where the mixture is heated and maintained at a temperature which is higher than 685° C.

At this time, the raw aluminum mixed powder is mixed with the water-soluble resin binder, water, and the plasticizer to obtain the viscous composition, and the viscous composition is dried in a state where air bubbles are mixed therein to obtain the formed object prior to sintering. Then, and the formed object prior to sintering is heated at a temperature in the above-mentioned range. As a result, since the formed object prior to sintering has a sponge skeleton structure (three-dimensional skeleton structure, foamed skeleton structure including open pores), the obtained sintered body becomes porous aluminum which includes two different kinds of pores including pores surrounded by the sponge skeletons and pores formed in the sponge skeleton itself.

The aluminum powder is provided such that the viscous composition has a viscosity at a level at which the viscous composition can be formed into a desired shape on the aluminum foil or the aluminum plate and the formed object prior to sintering and after foaming has a desired handling strength. That is, in the case where the average particle diameter is small, it is necessary to increase the quantity (mass) of water-soluble resin binder with respect to the quantity (mass) of the aluminum powder so as to secure the viscosity and the handling strength. However, in the case where the quantity (mass) of the water-soluble resin binder becomes large, the amount of carbon remaining in the aluminum is increased while the formed object prior to sintering is heated, and the remained carbon inhibits the sintering reaction. On the other hand, in the case where the particle diameter of the aluminum powder is excessively large, the strength of the porous sintered body is lowered.

Therefore, it is preferable that the average particle diameter of the aluminum powder be in a range of 2 μm or greater; and thereby, the inhibition of the sintering reaction due to the large quantity (mass) of water-soluble resin binder is prevented. Moreover, it is preferable that the average particle diameter of the aluminum powder be 200 μm or smaller; and thereby, the strength of the porous sintered body is secured. More preferably, the average particle diameter of the aluminum powder is set to be in a range of 7 μm to 40 μm.

With regard to the sintering aid powder, it is preferable that the average particle diameter r (μm) and the mixing ratio W (% by mass) fulfill $1 \, (\mu m) \leq r \leq 30 \, (\mu m)$, $0.1 \, (\% \text{ by mass}) \leq W \leq 20 \, (\% \text{ by mass})$, and $0.1 \leq W/r \leq 2$.

The reason is as follows. In the case where the mixing ratio W of the sintering aid powder exceeds 20% by mass, sintering aid particles have contact with each other in the raw aluminum mixed powder; and thereby, the reaction heat between aluminum and titanium cannot be controlled, and a desired porous sintered body cannot be obtained. Therefore, it is preferable to fulfill $0.1 \, (\% \text{ by mass}) \leq W \leq 20 \, (\% \text{ by mass})$. In addition, it is more preferable to fulfill $1 \, (\% \text{ by mass}) \leq W \leq 20 \, (\% \text{ by mass})$.

Even in the case where the mixing ratio fulfills $0.1 \, (\% \text{ by mass}) \leq W \leq 20 \, (\% \text{ by mass})$, the reaction heat between aluminum and titanium became excessively high in some cases depending on the particle diameter of the sintering aid powder. In these cases, the temperature of melted aluminum due to the reaction heat further rose; and thereby, the viscosity thereof was lowered. As a result, liquid droplets were generated in some cases.

In view of these, test pieces were manufactured under various conditions, and the test pieces were observed by an electron microscope. As a result of the observation, it was found that only a surface layer portion having a substantially constant thickness from the exposed surface side of the titanium particle reacted with aluminum in the case where the amount of heat generation was controlled to be in a range controllable by the mixing ratio of titanium and the particle diameter of titanium. From the experimental results, it was found that the conditions of $1 \, (\mu m) \leq r \leq 30 \, (\mu m)$ and $0.1 \, (\% \text{ by mass}) \leq W/r \leq 2 \, (\% \text{ by mass})$ are preferable in order to prevent the occurrence of liquid droplets.

Hereinafter, the meaning of $0.1 \leq W/r \leq 2$ in the case of using titanium as the sintering aid powder will be described. When the average particle diameter of titanium is expressed as r, the number of titanium particles is expressed as N, the additive quantity (mass) of titanium is expressed as w, the specific weight of titanium is expressed as D, and the reduction amount in the titanium particle diameter due to the reaction with aluminum is expressed as d, the reaction heat amount Q fulfills $Q \propto 4\pi r^2 dN$ since the reaction heat amount Q is proportional to the volume of reacted titanium. Moreover, since the additive amount of the titanium particles is calculated as a product of the average volume of one titanium particle and the number of titanium particles, $w = 4/3 \pi r^3 DN$ is obtained. Accordingly, if the latter equation is substituted into the former equation, $Q \propto 3wd/rD$ is obtained. Here, $Q \propto w/r$ is further obtained based on the fact that 3/D is a constant and the observation result that d is substantially constant regardless of the sintering conditions. Therefore, the range of W/r in which the liquid droplets are not generated is experimentally determined and the range is limited as described above. Thereby, the generation of liquid droplets due to the excessively high reaction heat between aluminum and titanium is prevented.

In addition, the titanium hydride as the sintering aid powder contains titanium at a content of 95% by mass or greater, and dehydrogenation of the titanium hydride occur at a temperature of 470 to 530° C. to convert into titanium. Therefore, the titanium hydride is thermally decomposed into titanium by the aforementioned heating. Accordingly, it is possible to enhance the reaction efficiency with the aluminum powder by using titanium and/or titanium hydride as the sintering aid powder.

In the case where the contained amount of the water-soluble binder exceeds 7% of the quantity (mass) of the raw aluminum mixed powder, the amount of carbon remaining in the formed object prior to sintering is increased during heating, and the remained carbon inhibits the sintering reaction. On the other hand, in the case where the contained amount of the water-soluble binder is less than 0.5%, it is difficult to secure the handling strength of the formed object prior to sintering. Therefore, it is preferable that the water-soluble binder be contained at a content in a range of 0.5% to 7% of the quantity (mass) of the raw aluminum mixed powder.

In addition, it is possible to effectively generate air bubbles by adding a surfactant to the raw aluminum mixed powder. In the case where the added amount of this surfactant is set to be in a range of 0.02% or greater of the quantity (mass) of the raw aluminum mixed powder, it is possible to achieve an effect due to the addition of the surfactant. In the case where the added amount of the surfactant is set to be in a range of 3% or smaller of the quantity (mass) of the raw aluminum mixed powder, it is also possible to prevent the inhibition of the sintering reaction due to the increased amount of carbon remaining in the formed object prior to sintering.

BEST MODE FOR CARRYING OUT THE INVENTION

Figure 1:
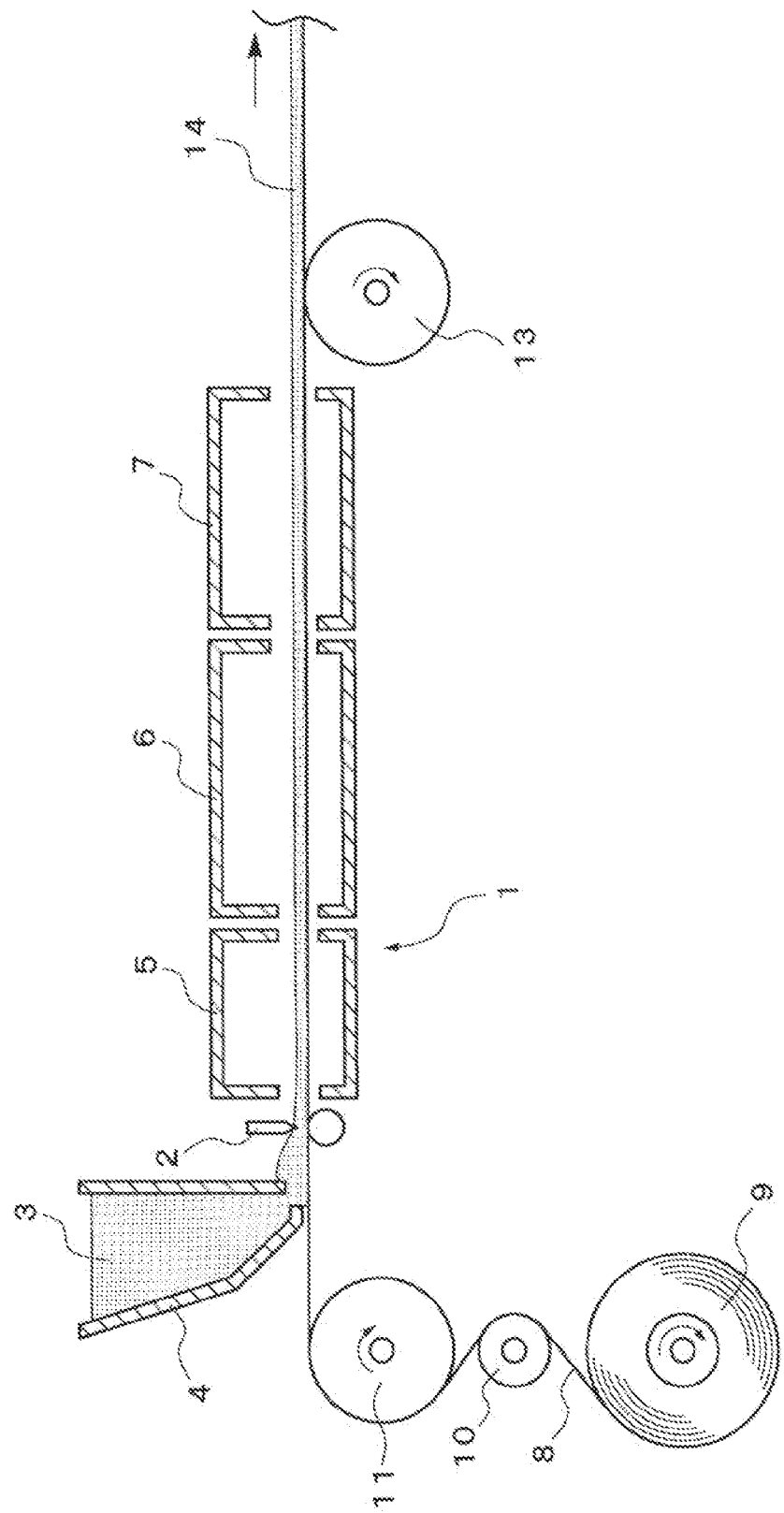
FIG. 1 is a configuration diagram schematically showing an example of an apparatus which performs a method for producing an aluminum composite including porous sintered aluminum of the present invention.

Hereinafter, one embodiment of the method for producing an aluminum composite including porous sintered aluminum according to the present invention will be described.

Description will be given of an outline of the producing method according to this embodiment. First, aluminum power is mixed with titanium and/or titanium hydride to obtain raw aluminum mixed powder (process for providing raw aluminum mixed powder). Then, water-soluble resin binder, water, and plasticizer containing at least one selected from polyhydric alcohols, ethers, and esters, and a water-insoluble hydrocarbon-based organic solvent containing five to eight carbon atoms are added and mixed into the raw aluminum mixed powder to obtain a viscous composition (process for providing a viscous composition).

Then a slurry of this viscous composition is extended on an aluminum foil by a doctor blade method or the like so as to have a predetermined uniform thickness, and then the slurry is dried to obtain a formed object prior to sintering (process prior to sintering).

Thereafter, the formed object prior to sintering is heated and sintered at a heating temperature T that fulfills Tm-10 (° C.)≤heating temperature T≤685 (° C.) in a non-oxidizing atmosphere (sintering process). Here, Tm (° C.) represents the temperature at which the raw aluminum mixed powder starts to melt.

Next, detailed description will be given of each process in the producing method.

In the process of providing the raw aluminum mixed powder, an aluminum powder having an average particle diameter of 2 to 200 μm is used. The reason is as follows. In the case where the average particle diameter is small, it is necessary to add a large amount of water-soluble resin binder to the aluminum powder in order that the viscous composition has a viscosity at which the viscous composition can be formed in to a desired shape and the formed object prior to sintering has a handling strength. However, in the case where a large amount of water-soluble resin binder is added, an amount of carbon remaining in the aluminum is increased when the formed object prior to sintering is heated, and the remained carbon inhibits the sintering reaction. On the other hand, in the case where the particle diameter of the aluminum powder is excessively large, the strength of the foamed aluminum is lowered. Accordingly, as described above, the aluminum powder having the average particle diameter in a range of 2 to 200 μm is used, and the average particle diameter is more preferably in a range of 7 to 40 μm. In addition, the average particle diameter can be measured by laser diffractometry.

The aluminum powder is mixed with a sintering aid powder containing titanium and/or titanium hydride. The reason is as follows. In the case where the formed object prior to sintering is heated at the heating temperature T which fulfills Tm-10 (° C.)≤heating temperature T≤685 (° C.), it is possible to perform sintering of aluminum under ordinary pressure without generating lumps of liquid droplets. In addition, titanium hydride ($TiH_2$) contains titanium at a content of 47.88 (molecular weight of titanium)/(47.88+1 (molecular weight of hydrogen)×2), which is 95% by mass or greater, and dehydrogenation of the titanium hydride occurs at a temperature of 470 to 530° C. to convert into titanium. Therefore, the titanium hydride is thermally decomposed into titanium by the aforementioned heating. Accordingly, it is possible to perform sintering of aluminum under ordinary pressure without generating lumps of liquid droplets even in the case where the titanium hydride is mixed thereinto. In addition, another sintering aid powder may be added as long as the sintering aid agent contains titanium and/or titanium hydride.

At this time, the content of titanium is preferably in a range of 0.1 to 20% by mass with respect to the total 100% by mass of aluminum and titanium in the sintering aid agent containing titanium.

Here, when the average particle diameter of titanium or titanium hydride is expressed as r (μm), and the mixing ratio of titanium or titanium hydride is expressed as W (% by mass), the following equations are preferably fulfilled: 1 (μm)≤r≤30 (μm), 0.1 (% by mass)≤W≤20 (% by mass), and 0.1≤W/r≤2. More preferably, the equation of 1 (% by mass)≤W≤20 (% by mass) is fulfilled.

That is, in the case where the titanium hydride powder has an average particle diameter of 4 μm, 0.1≤W/4≤2 is to be fulfilled; and therefore, the mixing ratio W becomes in a range of 0.4 to 8% by mass. In the case where the titanium powder has an average particle diameter of 20 μm, 0.1≤W/20≤2 is to be fulfilled; and therefore, the mixing ratio W becomes in a range of 2 to 40% by mass. However, since 0.1 (% by mass)≤W≤20 (% by mass) is to be fulfilled, the mixing ratio preferably becomes in a range of 2 to 20% by mass.

The average diameter of titanium hydride is set to fulfill 0.1 (μm)≤r≤30 (μm), the average diameter is preferably set to fulfill 1 (μm)≤r≤30 (μm) and is more preferably set to fulfill 4 (μm)≤r≤20 (μm). The reason is as follows. In the case where the average diameter of titanium hydride is smaller than 1 μm, there is a concern of spontaneous combustion. In the case where the average particle diameter exceeds 30 μm, the compound phase of aluminum and titanium is easily peeled off from the titanium grains covered with the aluminum and titanium compound generated in sintering; and thereby, a desired strength of the sintered body cannot be obtained.

The reason that 0.1 (% by mass)≤W≤20 (% by mass) is preferably set is as follows. In the case where the mixing ratio W of the sintering aid powder exceeds 20% by mass, the sintering aid particles contact with each other in the raw aluminum mixed powder; and thereby, the reaction heat between aluminum and titanium cannot be controlled, and a desired porous sintered body cannot be obtained.

Even in the case where the mixing ratio fulfills 0.1 (% by mass)≤W≤20 (% by mass), the reaction heat between aluminum and titanium became excessively high in some cases depending on the particle diameter of the sintering aid powder, as a result of performing experiments under various conditions. In these cases, the temperature of melted aluminum due to the reaction heat further rose; and thereby, the viscosity thereof was lowered. As a result, liquid droplets were generated in some cases.

In view of these, test pieces were manufactured under various conditions, and the test pieces were observed by an electron microscope. As a result of the observation, it was found that only a surface layer portion having a substantially constant thickness from the exposed surface side of the titanium particle reacted with aluminum in the case where the amount of heat generation was controlled to be in a range controllable by the mixing ratio of titanium and the particle diameter of titanium. From the experimental results, it was found that the conditions of 1 (μm)≤r≤30 (μm) and 0.1 (% by mass)≤W/r≤2 (% by mass) are preferable in order to prevent the occurrence of liquid droplets.

Next, the following components are added to the raw aluminum mixed powder in the process of providing the viscous composition: at least one kind selected from polyvinyl alcohol, methylcellulose, and ethylcellulose as a water-soluble resin binder; at least one kind selected from polyethyleneglycol, glycerin, and di-N-buthyl phthalate as a plasticizer; distilled water; and alkylbetaine as a surfactant.

In the case where at least one kind selected from polyvinyl alcohol, methylcellulose, and ethylcellulose is used as the water-soluble resin binder, a relatively small additive amount is sufficient. Therefore, the additive amount (ratio) thereof is set to be in a range of 0.5% by mass to 7% by mass with respect to 100 parts by mass of the raw aluminum mixed powder. In the case where the additive amount of the water-soluble resin binder exceeds 7% with respect to 100 parts by mass of the raw aluminum mixed powder, the amount of carbon remaining in the formed object prior to sintering is increased during heating, and the remained carbon inhibits the sintering reaction. In the case where the additive amount of the water-soluble resin binder is less than 0.5% by mass, the handling strength of the formed object prior to sintering cannot be secured.

Alkylbetain is added at an amount (ratio) of 0.02% by mass to 3% by mass with respect to 100% by mass of the raw aluminum mixed powder. In the case where the amount (containing ratio) exceeds 0.02% by mass with respect to 100% by mass of the raw aluminum mixed powder, air bubbles are effectively generated during mixing a water-insoluble hydrocarbon-based organic solvent which will be described later. By setting the amount (containing ratio) to be 3% by mass or lower, the inhibition of the sintering reaction due to the increased amount of carbon remaining in the formed object prior to sintering can be prevented.

After kneading the mixture, foaming is performed by further mixing the water-insoluble hydrocarbon-based organic solvent containing 5 to 8 carbon atoms; and thereby, a viscous composition including air bubbles mixed thereinto is prepared. As the water-insoluble hydrocarbon-based organic solvent containing 5 to 8 carbon atoms, at least one kind selected from pentane, hexane, heptane, and octane can be used.

Next, the process prior to sintering is performed with the use of a shape-forming apparatus as shown in FIG. 1 in this embodiment.

This shape-forming apparatus 1 includes a doctor blade 2, a hopper 4 for the viscous composition 3, a preliminary drying chamber 5, a tank 6 at constant temperature and high humidity, a drying tank 7, a feeding reel 9 for an aluminum foil 8, supporting rolls 10 and 11 for the aluminum foil 8, and a roll 13 which guides and supports a formed object 14 prior to sintering, in which porous aluminum prior to sintering is coated on the aluminum foil 8.

In the process prior to sintering, the strip-shaped 99.9% aluminum foil 8 with a thickness of 20 μm is sequentially reeled out from the feeding reel 9, and the upper surface (coating surface) of the aluminum foil 8 is coated with the viscous composition 3 in the hopper with the doctor blade 2 so as to have a coating thickness of 0.05 to 5 mm. Thereafter, foaming is performed from the preliminary drying chamber 5 to the tank 6 at constant temperature and high humidity such that the dimensions of the bubbles are uniformized. Then, the object is dried in the drying tank 7 at the temperature of 70° C. Subsequently, the formed object 14 prior to sintering fed from the roll 13 is cut into a predetermined shape such as a circle with a diameter of 100 mm or the like, if necessary.

Next, in the sintering process, zirconia spinkle powder is spread on an alumina setter, and the formed object 14 prior to sintering is placed on the alumina setter. Then, pre-sintering is performed by holding the formed object prior to sintering at 520° C. for one hour in an argon atmosphere whose dew point is −20° C. or lower. Thereby, a binder solution including the water-soluble resin binder component, the plasticizer component, the distillated water, and alkylbetaine in the formed object 14 prior to sintering is evaporated and/or is decomposed (removal of binder). In addition, dehydrogenation proceeds in the case where titanium hydride is used as the sintering aid powder.

Figure 2:
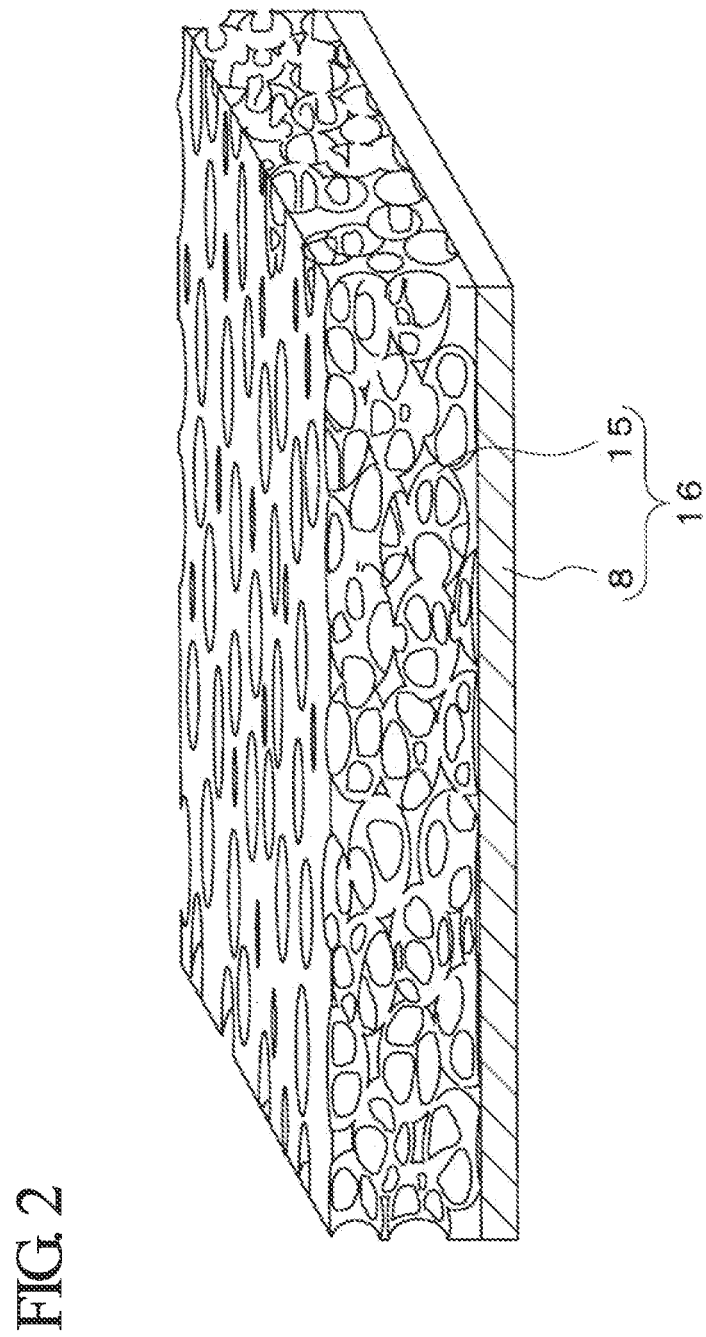
FIG. 2 is a perspective view showing a shape of an aluminum composite including porous sintered aluminum produced according to an embodiment of the present invention.

Thereafter, the formed object prior to sintering which is pre-sintered is heated at a heating temperature T which fulfills Tm-10 (° C.)≤heating temperature T≤685 (° C.) in an argon atmosphere whose dew point is −40° C. or lower. Thereby, an aluminum composite 16 can be obtained in which porous sintered aluminum 15 is integrally joined onto one surface of the aluminum foil 8 as shown in FIG. 2.

At this time, it is considered that the reaction of the titanium component as the sintering aid agent with the aluminum powder and the aluminum foil starts by heating the formed object prior to sintering up to the melting temperature Tm (=660° C.) of aluminum. However, the aluminum powder and the aluminum foil contain eutectic alloy elements such as Fe, Si, and the like as impurities; and thereby, the melting points thereof are lowered. Therefore, it is considered that the reaction between aluminum and titanium starts by heating up to Tm-10 (° C.); and thereby, porous sintered aluminum is formed, and the aluminum foil is fixedly joined.

Specifically, the melting point of aluminum is 660° C.; however, the melting start temperature of an atomized powder having a purity of about 98% to 99.7%, which is marketed as a pure aluminum powder, is about 650° C. On the other hand, in the case where the heating is performed at the temperature which is higher than 685° C., lumps of aluminum liquid droplets are generated in the sintered object.

In addition, it is necessary to perform the heating of the sintering process in a non-oxidizing atmosphere in order to suppress the growth of oxide layers on the aluminum particle surface and the titanium particle surface. However, the oxide layers on the aluminum particle surface and the titanium particle surface do not remarkably grow even in the case of heating in the air under the conditions where the heating temperature is 400° C. or lower and the holding time is about 30 minutes, as the preliminary heating. Therefore, debinding may be performed by heating and holding the formed object prior to sintering may be heated and held at a temperature in a range of 300° C. to 400° C. for about 10 minutes in the air so as to conduct removal of binder and then the formed object prior to sintering may be heated at a predetermined temperature in an argon atmosphere.

Figure 3:
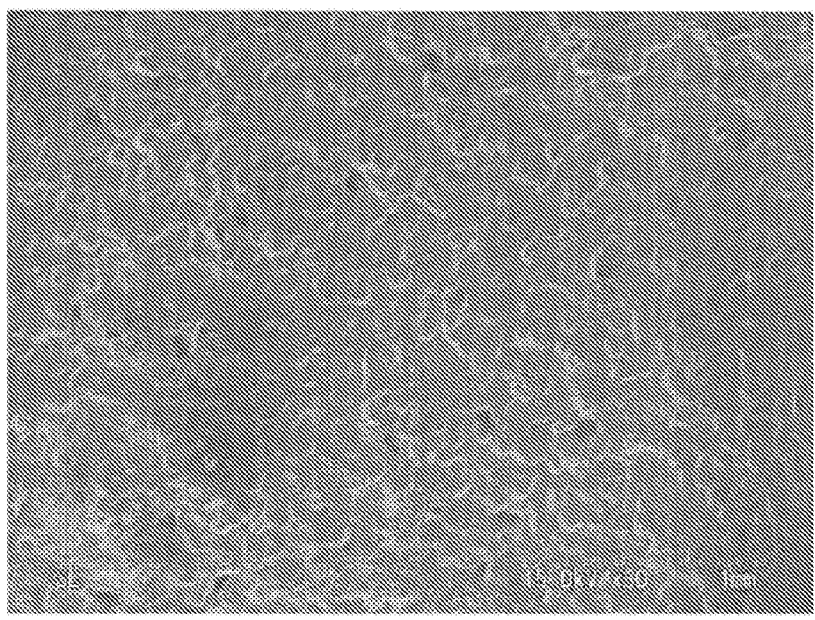
FIG. 3 is an SEM photograph of the surface of the aluminum foil of FIG. 2.
Figure 4:
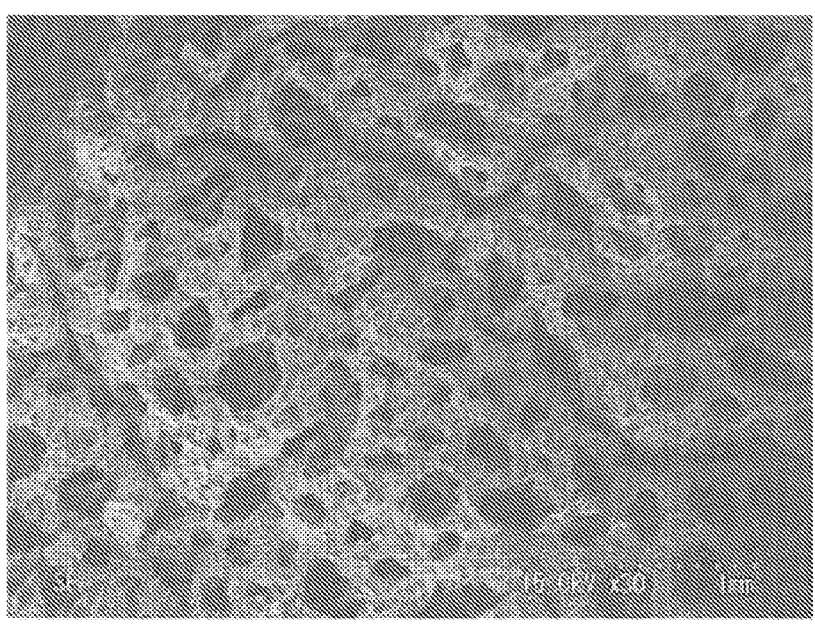
FIG. 4 is an SEM photograph of the surface of the foamed aluminum (porous sintered aluminum) of FIG. 2.
Figure 5:
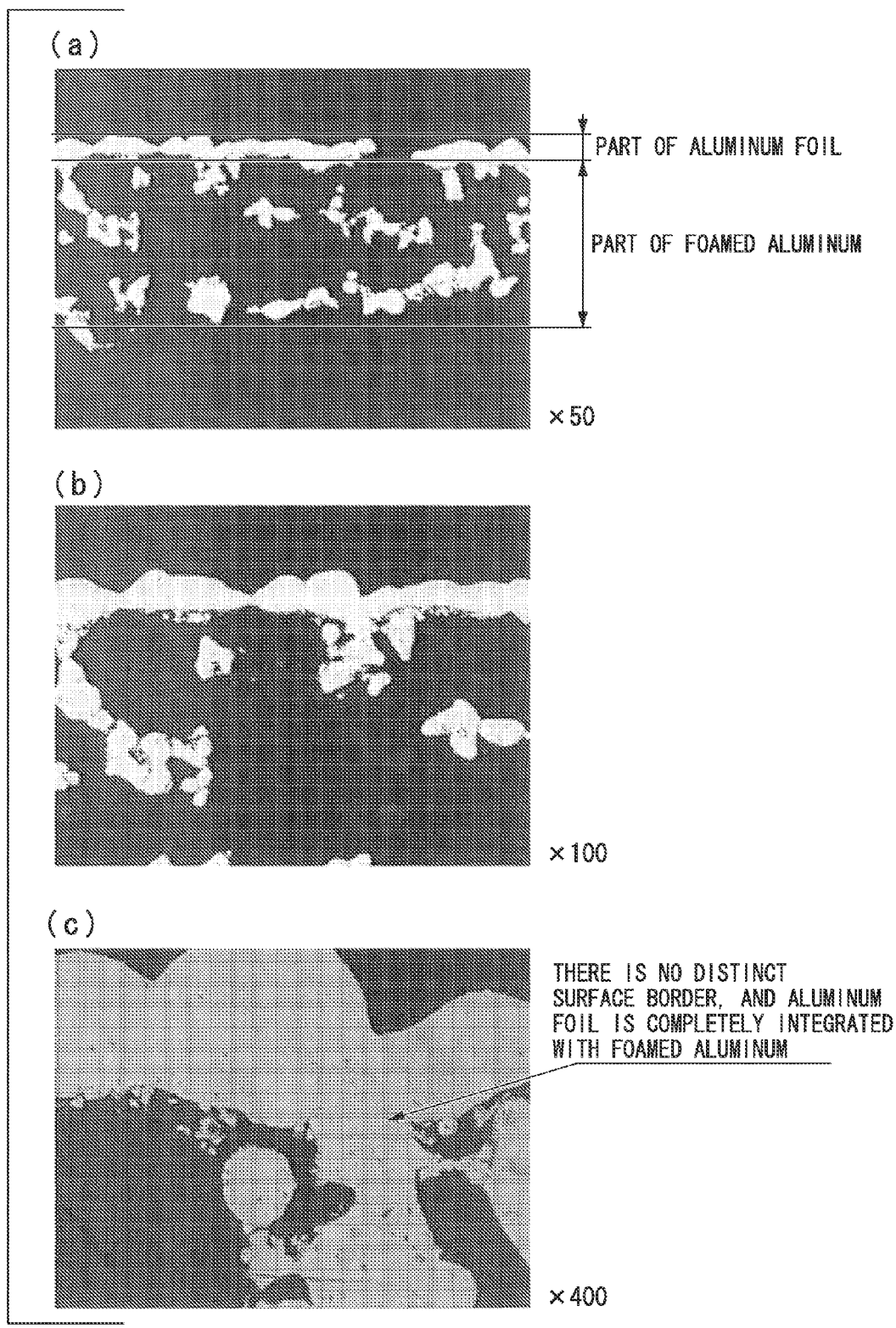
FIG. 5 is an SEM photograph of the cross section of the composite of FIG. 2, where (a) is a photograph at 50-fold magnification, (b) is a photograph at 100-fold magnification, and (c) is a photograph at 400-fold magnification.

As shown in FIGS. 3 to 5, the thus obtained aluminum composite includes a dense aluminum foil layer on one surface and the porous sintered aluminum on the other surface. The porous sintered aluminum includes metal skeletons having a three-dimensional network structure, and Al—Ti compounds are uniformly dispersed in the porous sintered aluminum.

In addition, 20 or more pores are formed per linear length of 1 cm in the porous sintered aluminum, and the porous sintered aluminum has an overall porosity of 70 to 90%.

Moreover, there is no distinct border between the porous sintered aluminum and the aluminum foil as shown in the enlarged SEM photograph of FIG. 5(c), and the porous sintered aluminum and the aluminum foil are completely integrated.

Therefore, the aluminum composite can be suitably used as current collectors of a lithium ion secondary battery and an electrical double layer capacitor.

EXAMPLES

Examples 1 to 16

Al powders having average particle diameters of 2.1 μm, 9.4 μm, 24 μm, 87 μm, and 175 μm, Ti powders having average particle diameters of 9.8 μm, 24 μm, and 42 μm, and $TiH_2$ powders having average particle diameters of 4.2 μm, 9.1 μm, and 21 μm were prepared. Then, in accordance with the aforementioned embodiment, the Al powder was mixed with the Ti powder and/or the $TiH_2$ powder at the ratios shown in Table 1 to prepare raw aluminum mixed powders 1 to 10, and binder solutions 1 to 5 having the compounding compositions shown in Table 2 were prepared. They were kneaded with a water-insoluble hydrocarbon-based organic solvent at the ratios shown in Table 3 to manufacture viscous compositions of Examples 1 to 16.

TABLE 1

| | Raw aluminum mixed powder | | | | | | | | | | | |
|---|---|---|---|---|---|---|---|---|---|---|---|---|
| | Aluminum powder | | | | | | | Sintering aid powder | | | | Sintering |
| | Composition (% by weight) | | | | | | Average | Mixing ratio (% by weight) | | Average | | aid |
| | Fe | Si | Ni | Mg | Cu | Al and inevitable impurities | particle diameter (μm) | Ti | $TiH_2$ | particle diameter (μm) r | Aluminum powder | powder W | W/r |
| Raw aluminum mixed powder 1 of the present invention | 0.15 | 0.05 | 0.01 | — | — | remainder | 24 | 0 | 100 | 9.1 | remainder | 1 | 0.11 |
| Raw aluminum mixed powder 2 of the present invention | 0.15 | 0.05 | 0.01 | — | — | remainder | 24 | 0 | 100 | 21 | remainder | 5 | 0.24 |
| Raw aluminum mixed powder 3 of the present invention | 0.15 | 0.05 | 0.01 | — | — | remainder | 24 | 0 | 100 | 21 | remainder | 15 | 0.71 |
| Raw aluminum mixed powder 4 of the present invention | 0.15 | 0.05 | 0.01 | — | — | remainder | 24 | 0 | 100 | 9.1 | remainder | 10 | 1.1 |
| Raw aluminum mixed powder 5 of the present invention | 0.15 | 0.05 | 0.01 | — | — | remainder | 24 | 0 | 100 | 4.2 | remainder | 5 | 1.2 |
| Raw aluminum mixed powder 6 of the present invention | 0.15 | 0.05 | 0.01 | — | — | remainder | 24 | 0 | 100 | 2.8 | remainder | 5 | 1.8 |
| Raw aluminum mixed powder 7 of the present invention | 0.16 | 0.08 | — | — | — | remainder | 9.4 | 50 | 50 | 23 | remainder | 0.5 | 0.022 |

TABLE 1-continued

| | Raw aluminum mixed powder | | | | | | | | | | | | |
|---|---|---|---|---|---|---|---|---|---|---|---|---|---|
| | Aluminum powder | | | | | | | Sintering aid powder | | | | | |
| | Composition (% by weight) | | | | | | Average particle diameter | Mixing ratio (% by weight) | | Average particle diameter | Aluminum powder | Sintering aid powder | |
| | Fe | Si | Ni | Mg | Cu | Al and inevitable impurities | (μm) | Ti | TiH₂ | (μm) r | | W | W/r |
| Raw aluminum mixed powder 8 of the present invention | 0.18 | 0.06 | 0.01 | 0.4 | 1.6 | remainder | 87 | 100 | 0 | 24 | remainder | 1 | 0.042 |
| Raw aluminum mixed powder 9 of the present invention | 0.2 | 0.3 | 1.6 | 0.4 | 0.1 | remainder | 175 | 100 | 0 | 23 | remainder | 5 | 0.22 |
| Raw aluminum mixed powder 10 of the present invention | 0.2 | 0.05 | — | — | — | remainder | 2.1 | 0 | 100 | 4.2 | remainder | 1 | 0.24 |
| Comparative raw aluminum mixed powder 31 | 0.11 | 0.05 | — | — | — | remainder | 220*¹ | 100 | 0 | 24 | remainder | 5 | 0.21 |
| Comparative raw aluminum mixed powder 32 | 0.15 | 0.05 | 0.01 | — | — | remainder | 24 | 0 | 100 | 21 | remainder | 0.1 | 0.005*² |
| Comparative raw aluminum mixed powder 33 | 0.15 | 0.05 | 0.01 | — | — | remainder | 24 | 0 | 100 | 4.2 | remainder | 15 | 3.6*² |
| Comparative raw aluminum mixed powder 34 | 0.15 | 0.05 | 0.01 | — | — | remainder | 24 | 0 | 100 | 21 | remainder | 25*² | 1.2 |
| Comparative raw aluminum mixed powder 35 | 0.15 | 0.05 | 0.01 | — | — | remainder | 24 | 100 | 0 | 42*² | remainder | 15 | 0.36 |

*¹out of the scope of Claim 3; average particle diameter of aluminum powder: 2 μm to 200 μm
*²out of the scope of Claim 4; average particle diameter and mixing ratio of sintering aid powder: $1 \leq r \leq 30$ and $0.01 \leq W/r \leq 2$

TABLE 2

| | Compounding composition of binder solution (% by weight) | | | | | | |
|---|---|---|---|---|---|---|---|
| | Water-soluble resin binder | | | Plasticizer | | Surfactant | |
| | MC | EC | PVA | Gr | PEG | AB | Water |
| Binder solution 1 | 5 | — | — | 3 | 3 | 0.1 | remainder |
| Binder solution 2 | 0.1 | 2.9 | — | 3 | 3 | 0.5 | remainder |
| Binder solution 3 | 0.2 | — | 4.8 | 1 | 5 | 2 | remainder |
| Binder solution 4 | 9 | — | — | 7 | 5 | 0.5 | remainder |
| Binder solution 5 | 5 | — | — | 3 | 3 | 5 | remainder |

MC: methylcellulose
EC: ethylcellulose
PVA: polyvinyl alcohol
Gr: glycerin
PEG: polyethyleneglycol
AB: alkylbetaine

TABLE 3

| | Components of viscous composition | | | | | | | |
|---|---|---|---|---|---|---|---|---|
| | Raw aluminum mixed powder A | | Binder solution | | Water-insoluble hydrocarbon-based organic solvent | | Ratio of water-soluble resin binder to A (%) | Ratio of surfactant to A (%) |
| | Type | Mixing ratio (% by weight) | Type | Mixing ratio (% by weight) | Type | Mixing ratio (% by weight) | | |
| Example 1 | Raw aluminum mixed powder 1 of the present invention | 50 | Binder solution 2 | 49 | hexane | 1 | 2.8 | 0.49 |
| Example 2 | Same as above | 50 | Binder solution 2 | 49 | heptane | 1 | 2.8 | 0.49 |

TABLE 3-continued

| | | | | | | | | |
|---|---|---|---|---|---|---|---|---|
| Example 3 | Same as above | 50 | Binder solution 2 | 49 | heptane | 1 | 2.8 | 0.49 |
| Example 4 | Same as above | 49 | Binder solution 2 | 49 | octane | 2 | 2.8 | 0.49 |
| Example 5 | Same as above | 50 | Binder solution 1 | 49 | octane | 1 | 4.9 | 0.098 |
| Example 6 | Same as above | 50 | Binder solution 1 | 49 | hexane | 1 | 4.9 | 0.098 |
| Example 7 | Same as above | 50 | Binder solution 3 | 49 | pentane | 1 | 4.7 | 1.96 |
| Example 8 | Raw aluminum mixed powder 2 of the present invention | 50 | Binder solution 1 | 49 | hexane | 1 | 4.9 | 0.098 |
| Example 9 | Raw aluminum mixed powder 3 of the present invention | 50 | Binder solution 1 | 49 | hexane | 1 | 4.9 | 0.098 |
| Example 10 | Raw aluminum mixed powder 4 of the present invention | 50 | Binder solution 1 | 49 | pentane | 1 | 4.9 | 0.098 |
| Example 11 | Raw aluminum mixed powder 5 of the present invention | 50 | Binder solution 1 | 49 | heptane | 1 | 4.9 | 0.098 |
| Example 12 | Raw aluminum mixed powder 6 of the present invention | 50 | Binder solution 1 | 49 | heptane | 1 | 4.9 | 0.098 |
| Example 13 | Raw aluminum mixed powder 7 of the present invention | 50 | Binder solution 1 | 49 | octane | 1 | 4.9 | 0.098 |
| Example 14 | Raw aluminum mixed powder 8 of the present invention | 50 | Binder solution 1 | 49 | octane | 1 | 4.9 | 0.098 |
| Example 15 | Raw aluminum mixed powder 9 of the present invention | 50 | Binder solution 1 | 49 | pentane | 1 | 4.9 | 0.098 |
| Example 16 | Raw aluminum mixed powder 10 of the present invention | 50 | Binder solution 1 | 49 | octane | 1 | 4.9 | 0.098 |

| | Conditions of producing formed object prior to sintering | | | | | |
|---|---|---|---|---|---|---|
| | | Process of adjusting dimensions of air bubbles uniformly | | | Drying process | |
| | Thickness of formed coating (mm) | Temperature (° C.) | Moisture (%) | Holding time (minute) | Temperature (° C.) | Holding time (minute) |
| Example 1 | 0.35 | 35 | 90 | 20 | 70 | 50 |
| Example 2 | 0.35 | 35 | 90 | 20 | 70 | 50 |
| Example 3 | 0.35 | 35 | 90 | 20 | 70 | 50 |
| Example 4 | 0.35 | 35 | 90 | 40 | 70 | 50 |
| Example 5 | 0.2 | 35 | 90 | 20 | 70 | 50 |
| Example 6 | 0.2 | 35 | 90 | 20 | 70 | 50 |
| Example 7 | 0.2 | 35 | 90 | 20 | 70 | 50 |
| Example 8 | 0.2 | 35 | 90 | 20 | 70 | 50 |
| Example 9 | 0.2 | 35 | 90 | 20 | 70 | 50 |
| Example 10 | 0.2 | 35 | 90 | 20 | 70 | 50 |
| Example 11 | 0.2 | 35 | 90 | 20 | 70 | 50 |
| Example 12 | 0.2 | 35 | 90 | 20 | 70 | 50 |
| Example 13 | 0.2 | 35 | 90 | 20 | 70 | 50 |
| Example 14 | 0.2 | 35 | 90 | 20 | 70 | 50 |
| Example 15 | 0.2 | 35 | 90 | 20 | 70 | 50 |
| Example 16 | 0.2 | 35 | 90 | 20 | 70 | 50 |

| | Heating conditions | | | | | |
|---|---|---|---|---|---|---|
| | Degreasing process | | | Sintering process | | |
| | Atmosphere | Temperature (° C.) | Holding time (minute) | Atmosphere | Temperature (° C.) | Holding time (minute) |
| Example 1 | Ar | 520 | 30 | Ar | 683 | 30 |
| Example 2 | Ar | 520 | 30 | Ar | 650 | 30 |
| Example 3 | Ar | 520 | 30 | Ar | 683 | 30 |
| Example 4 | Ar | 520 | 30 | Ar | 675 | 30 |
| Example 5 | Ar | 520 | 30 | Ar | 670 | 30 |
| Example 6 | Air | 350 | 30 | Ar | 670 | 30 |
| Example 7 | Air | 350 | 30 | Ar | 670 | 30 |
| Example 8 | Air | 350 | 30 | Ar | 670 | 30 |
| Example 9 | Air | 350 | 30 | Ar | 670 | 30 |
| Example 10 | Air | 350 | 30 | Ar | 670 | 30 |
| Example 11 | Air | 350 | 30 | Ar | 670 | 30 |

TABLE 3-continued

| | | | | | | |
|---|---|---|---|---|---|---|
| Example 12 | Air | 350 | 30 | Ar | 670 | 30 |
| Example 13 | Air | 350 | 30 | Ar | 670 | 30 |
| Example 14 | Ar | 520 | 30 | Ar | 655 | 30 |
| Example 15 | Ar | 520 | 30 | Ar | 651 | 30 |
| Example 16 | Air | 350 | 30 | Ar | 670 | 30 |

Next, the viscous compositions of Examples 1 to 16 were coated and extended on the surface of the aluminum foil by the doctor blade method, and the temperature and the moisture were controlled to be predetermined values for a specific time period so as to adjust the dimensions of air bubbles uniformly. Then, the viscous compositions were dried at 70° C. in an air dryer. The coating thicknesses of the viscous compositions, temperatures, moistures, and holding times at that time are shown in Table 3. Thereafter, the dried viscous compositions were cut out into circular shapes having diameters of 100 mm along with the aluminum foil to obtain formed objects prior to sintering in Examples 1 to 16.

Then, zirconia spinkle powder was spread on an alumina setter, and the formed objects prior to sintering in Examples 1 to 16 were placed on the alumina setter. The formed objects prior to sintering in Examples 1 to 16 were subjected to debinding in an atmosphere where argon flowed or in air. Thereafter, the formed objects prior to sintering in Examples 1 to 16 were heated to obtain foamed aluminums. The heating temperatures and heating holding times are also shown in Table 3.

Figure 6:
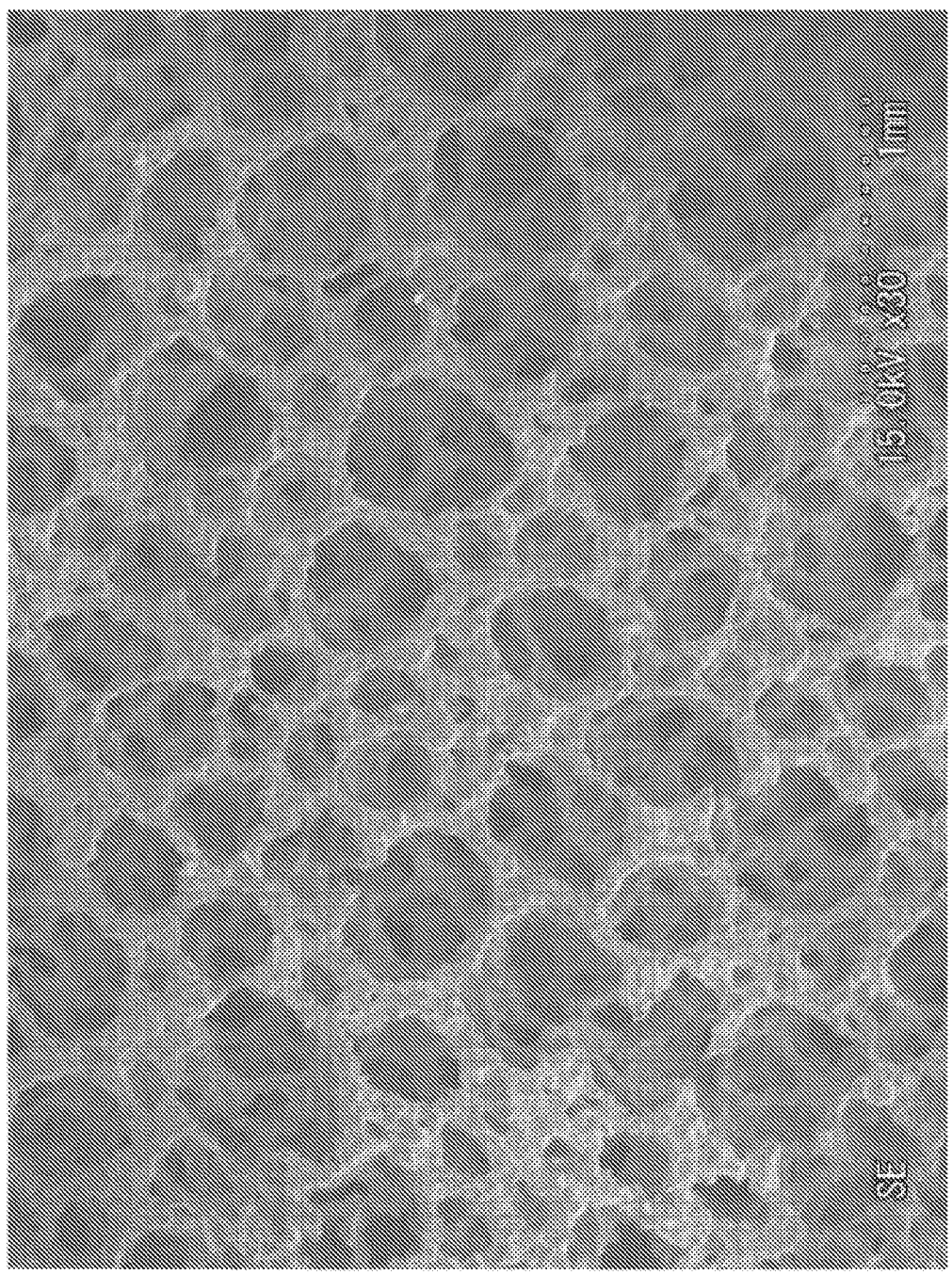
FIG. 6 is an SEM photograph of foamed aluminum in Example 1.
Figure 7:
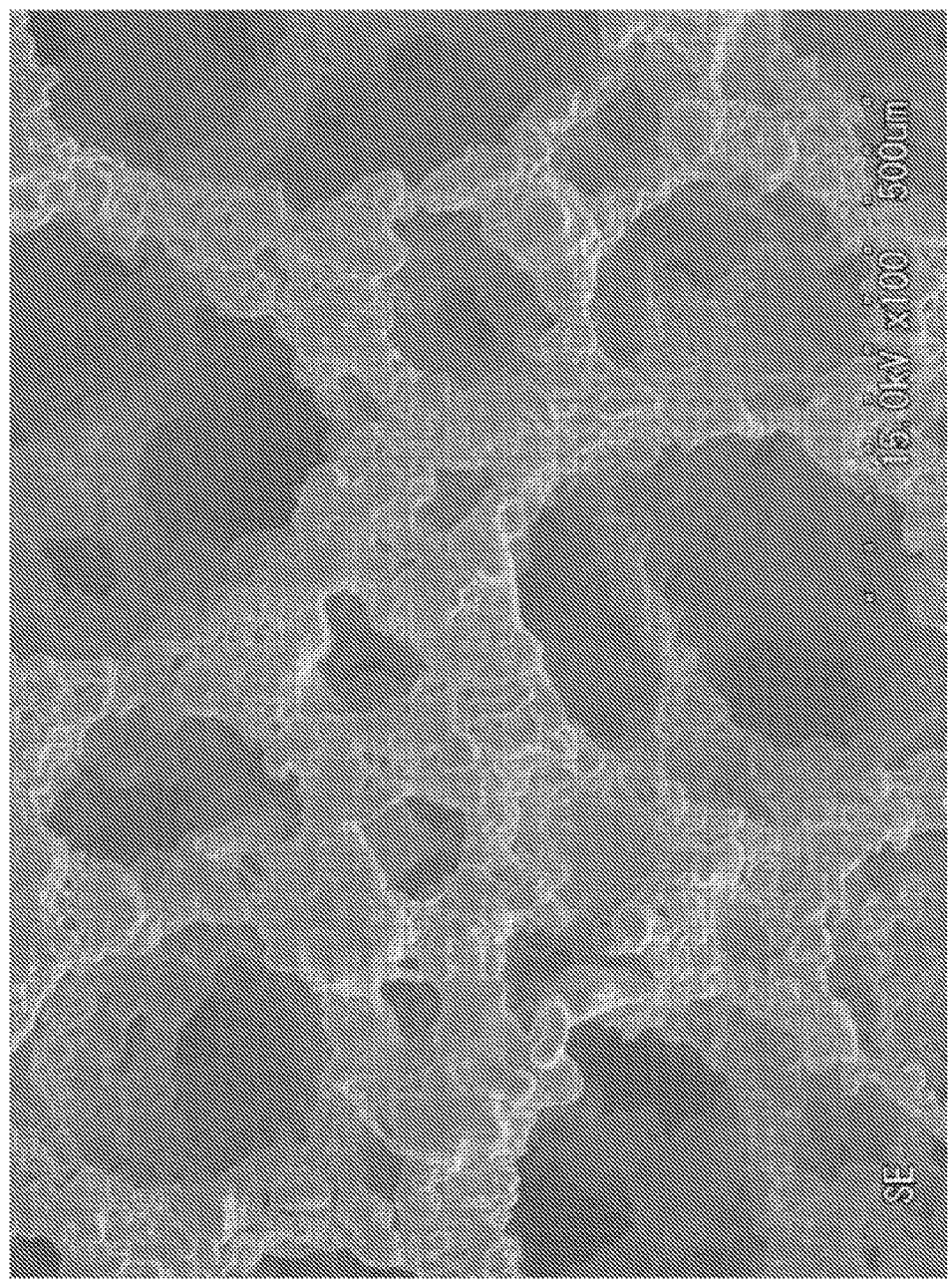
FIG. 7 is a partially enlarged SEM photogram of FIG. 6.

Next, the contraction percentages and porosities of the obtained foamed aluminums in Example 1 to 16 were calculated. In addition, the number of three-dimensional pores was measured in a stereoscopic microscope photograph, and the number of pores in the skeletons was measured in a scanning electron microscope (SEM) photograph. The obtained SEM photograph was observed to confirm whether solidification of liquid droplets occurred. Moreover, surface analyses were conducted by an electron probe micro analyzer (EPMA) to confirm whether Al—Ti compound existed on the surface of the skeletons of the foamed aluminums. The results are shown in Table 5, the SEM photograph of the foamed aluminums in Example 1 is shown in FIG. 6, and a partially enlarged photograph thereof is shown in FIG. 7.

Next, rolling extension tests were performed on the foamed aluminums in Examples 1 to 16 at a rolling reduction rate of 20%, and whether cracking occurred was visually confirmed. Thereafter, rectangular samples having dimensions of 20 mm×50 mm were cut out from the foamed aluminums, and the electrical resistances between opposed corners were measured. Then, the rectangular samples of the foamed aluminums were wound around an outer circumference of a cylindrical object having a diameter of 5 mm, and whether cracking occurred was visually confirmed. The results are shown in Table 5.

Comparative Examples 1 to 9

Figure 8:
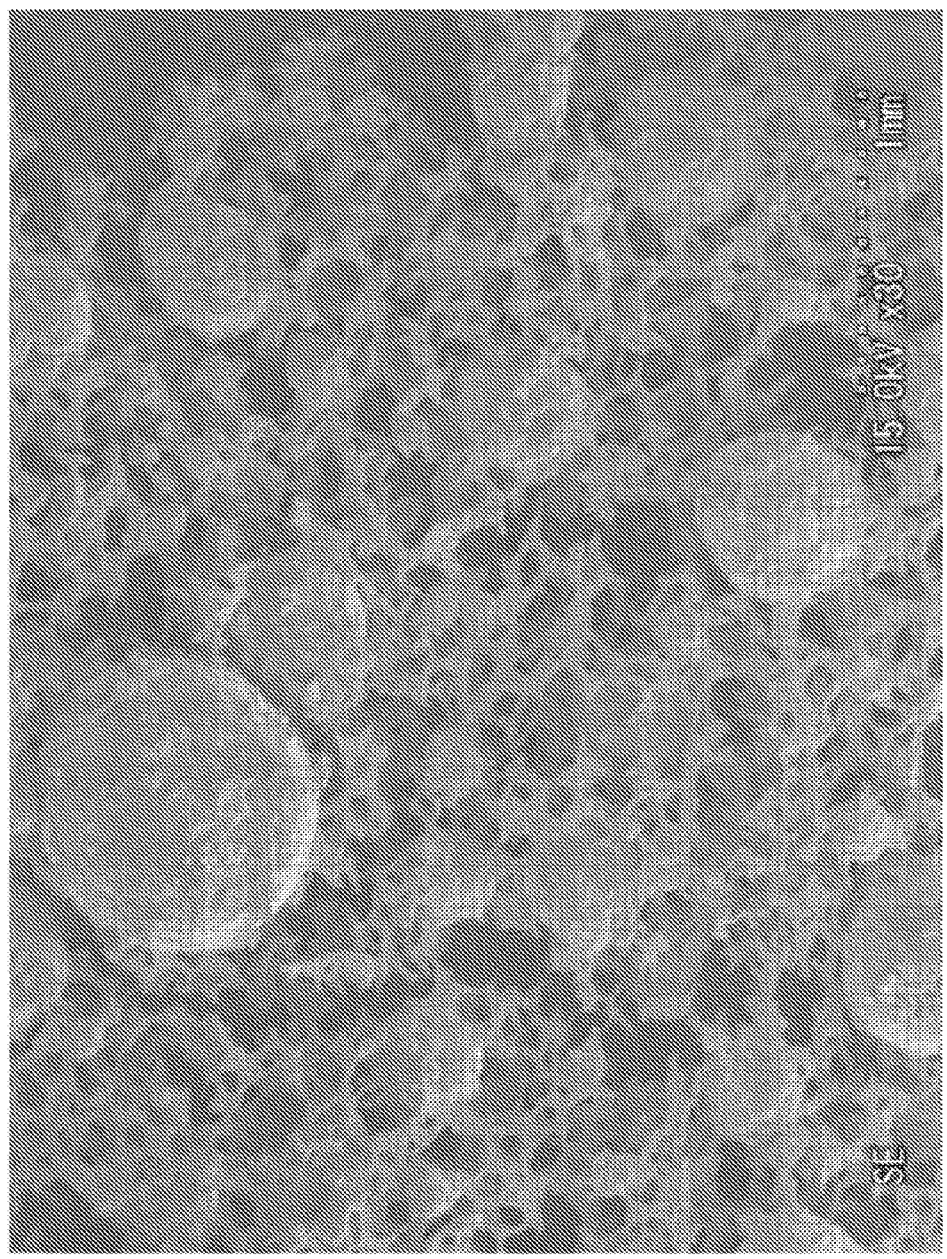
FIG. 8 is an SEM photograph of foamed aluminum in Comparative Example 1.
Figure 9:
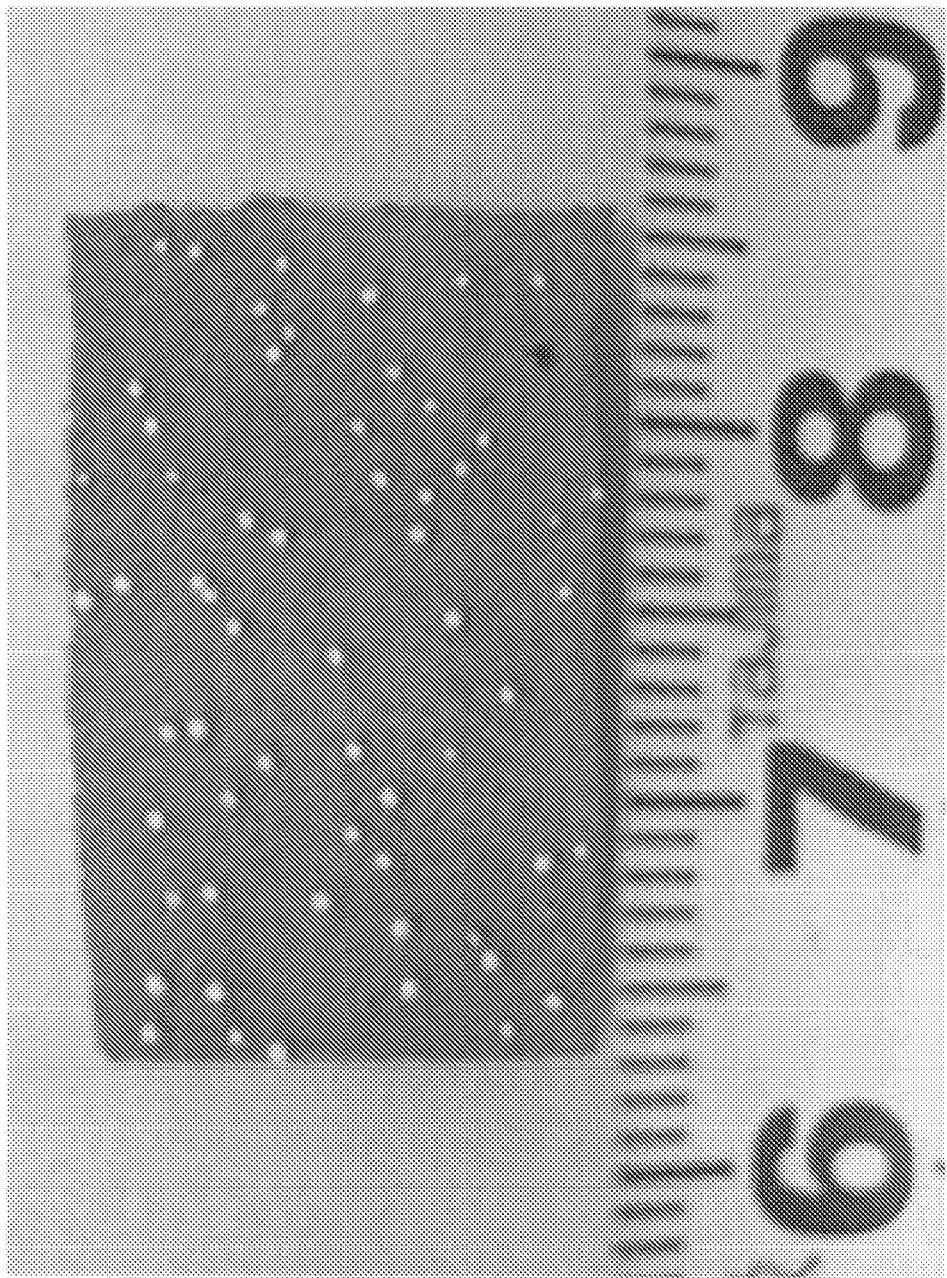
FIG. 9 is a photograph of foamed aluminum obtained by a combined method which includes a fifth method in the conventional art as a method of performing free sintering of aluminum powder and a slurry foaming method.

Comparative raw aluminum mixed powders 31 to 35 were prepared by using the same Al powder, Ti powder, and TiH$_2$ powder as those in Examples. Either one of the comparative raw aluminum mixed powders 31 to 35 and the raw aluminum mixed powder 1 of the present invention was mixed and kneaded with either one of the binder solutions 1 to 5 shown in Table 2 and the water-insoluble hydrocarbon-based organic solvent at the mixing ratios shown in Table 4. Other conditions were same as those in Examples. Thereby, foamed aluminums in Comparative Examples 1 to 9 were produced. The foamed aluminums in Comparative Examples 1 to 9 were evaluated by the same methods as those for Examples. The evaluation results are shown in Table 5, and an SEM photograph of the foamed aluminum in Comparative Example 1 is shown in FIG. 8.

TABLE 4

| | Components of viscous composition | | | | | | | |
|---|---|---|---|---|---|---|---|---|
| | Raw aluminum mixed powder A | | Binder solution | | Water-insoluble hydrocarbon-based organic solvent | | Ratio of water-soluble resin binder to A (%) | Ratio of surfactant to A (%) |
| | Type | Mixing ratio (% by weight) | Type | Mixing ratio (% by weight) | Type | Mixing ratio (% by weight) | | |
| Comparative Example 1 | Raw aluminum mixed powder 1 of the present invention | 50 | Binder solution 2 | 49 | hexane | 1 | 2.8 | 0.49 |
| Comparative Example 2 | Same as above | 50 | Binder solution 2 | 49 | heptane | 1 | 2.8 | 0.49 |
| Comparative Example 3 | Same as above | 50 | Binder solution 4 | 49 | octane | 1 | 8.82*4 | 0.49 |
| Comparative Example 4 | Same as above | 49 | Binder solution 5 | 49 | pentane | 1 | 4.9 | 4.9*5 |
| Comparative Example 5 | Comparative raw aluminum mixed powder 31 | 50 | Binder solution 1 | 49 | pentane | 1 | 4.9 | 0.098 |
| Comparative Example 6 | Comparative raw aluminum mixed powder 32 | 50 | Binder solution 1 | 49 | hexane | 1 | 4.9 | 0.098 |
| Comparative Example 7 | Comparative raw aluminum mixed powder 33 | 50 | Binder solution 1 | 49 | heptane | 1 | 4.7 | 0.098 |
| Comparative Example 8 | Comparative raw aluminum mixed powder 34 | 50 | Binder solution 1 | 49 | octane | 1 | 4.9 | 0.098 |

TABLE 4-continued

| | | | | | | | |
|---|---|---|---|---|---|---|---|
| Comparative Example 9 | Comparative raw aluminum mixed powder 35 | 50 | Binder solution 1 | 49 | pentane | 1 | 4.9 | 0.098 |

| | Condition of producing formed object prior to sintering | | | | | |
|---|---|---|---|---|---|---|
| | | Process of adjusting dimensions of air bubbles uniformly | | | Drying process | |
| | Thickness of formed coating (mm) | Temperature (° C.) | Moisture (%) | Holding time (minute) | Temperature (° C.) | Holding time (minute) |
| Comparative Example 1 | 0.35 | 35 | 90 | 20 | 70 | 50 |
| Comparative Example 2 | 0.35 | 35 | 90 | 20 | 70 | 50 |
| Comparative Example 3 | 0.35 | 35 | 90 | 20 | 70 | 50 |
| Comparative Example 4 | 0.2 | 35 | 90 | 20 | 70 | 50 |
| Comparative Example 5 | 0.2 | 35 | 90 | 20 | 70 | 50 |
| Comparative Example 6 | 0.2 | 35 | 90 | 20 | 70 | 50 |
| Comparative Example 7 | 0.2 | 35 | 90 | 20 | 70 | 50 |
| Comparative Example 8 | 0.2 | 35 | 90 | 20 | 70 | 50 |
| Comparative Example 9 | 0.2 | 35 | 90 | 20 | 70 | 50 |

| | Heating conditions | | | | | |
|---|---|---|---|---|---|---|
| | Degreasing process | | | Sintering process | | |
| | Atmosphere | Temperature (° C.) | Holding time (minute) | Atmosphere | Temperature (° C.) | Holding time (minute) |
| Comparative Example 1 | Ar | 520 | 30 | Ar | 690*[3] | 30 |
| Comparative Example 2 | Ar | 520 | 30 | Ar | 620*[3] | 30 |
| Comparative Example 3 | Ar | 520 | 30 | Ar | 683 | 30 |
| Comparative Example 4 | Ar | 520 | 30 | Ar | 670 | 30 |
| Comparative Example 5 | Air | 350 | 30 | Ar | 670 | 30 |
| Comparative Example 6 | Air | 350 | 30 | Ar | 670 | 30 |
| Comparative Example 7 | Air | 350 | 30 | Ar | 670 | 30 |
| Comparative Example 8 | Air | 350 | 30 | Ar | 670 | 30 |
| Comparative Example 9 | Air | 350 | 30 | Ar | 670 | 30 |

*[4]out of the scope of Claim 7
*[5]out of the scope of Claim 8
*[3]out of the scope of Claim 1

TABLE 5

| | Evaluation of foamed aluminum | | | | | | Evaluation of current collector for positive electrode of lithium-ion battery | |
|---|---|---|---|---|---|---|---|---|
| | Number of three-dimensional pores (PPI*[1]) | Number of pores in skeleton per skeleton length of 100 μm (pores/100 μm) | Presence or absence of solidified aluminum in the form of liquid droplet | Presence or absence of Al—Ti compound on skeleton surface | Electric resistivity ($\times 10^{-6}$ Ωm) | Presence or absence of cracking after 10% rolling and 5 mmφ winding test | Filling density of active material (g/cm$^3$) | Minimum diameter at which active material does not fall in winding test (mmφ) |
| Example 1 | 52 | 2.9 | Absent | Present | 3.1 | Absent | 4.8 | 2 |
| Example 2 | 52 | 3.5 | Absent | Present | 5.4 | Absent | 4.7 | 2 |
| Example 3 | 52 | 2.2 | Absent | Present | 2.2 | Absent | 4.6 | 1.5 |
| Example 4 | 65 | 2.3 | Absent | Present | 2.5 | Absent | 4.8 | 2 |

TABLE 5-continued

| | Evaluation of foamed aluminum | | | | | | Evaluation of current collector for positive electrode of lithium-ion battery | |
|---|---|---|---|---|---|---|---|---|
| | Number of three-dimensional pores (PPI*[1]) | Number of pores in skeleton per skeleton length of 100 μm (pores/100 μm) | Presence or absence of solidified aluminum in the form of liquid droplet | Presence or absence of Al—Ti compound on skeleton surface | Electric resistivity (×$10^{-6}$ Ωm) | Presence or absence of cracking after 10% rolling and 5 mmφ winding test | Filling density of active material (g/cm³) | Minimum diameter at which active material does not fall in winding test (mmφ) |
| Example 5 | 56 | 2.5 | Absent | Present | 2.6 | Absent | 4.2 | 2 |
| Example 6 | 55 | 2.5 | Absent | Present | 2.6 | Absent | 4.2 | 1.5 |
| Example 7 | 77 | 2.7 | Absent | Present | 2.7 | Absent | 4.2 | 2 |
| Example 8 | 54 | 2.8 | Absent | Present | 2.9 | Absent | 4.3 | 2 |
| Example 9 | 55 | 2.3 | Absent | Present | 2.3 | Absent | 4.3 | 2 |
| Example 10 | 52 | 2.6 | Absent | Present | 2.8 | Absent | 4.2 | 2 |
| Example 11 | 53 | 2.2 | Absent | Present | 3.2 | Absent | 4.2 | 2 |
| Example 12 | 55 | 2.4 | Absent | Present | 3.2 | Absent | 4.3 | 2 |
| Example 13 | 53 | 2.8 | Absent | Present | 3.4 | Absent | 4.1 | 2 |
| Example 14 | 55 | 3.4 | Absent | Present | 4.9 | Absent | 4.1 | 2.5 |
| Example 15 | 55 | 3.2 | Absent | Present | 4.3 | Absent | 4.2 | 2.5 |
| Example 16 | 54 | 2.4 | Absent | Present | 3.2 | Absent | 4.2 | 2 |
| Comparative Example 1 | 70 | 2 | Present* | Present | 2.9 | Present* | — | — |
| Comparative Example 2 | 50 | 5.1 | Absent | Present | 12.4* | Present* | — | — |
| Comparative Example 3 | 51 | 4.6 | Absent | Present | 11.9* | Present* | — | — |
| Comparative Example 4 | 65 | 4.3 | Absent | Present | 11.2* | Present* | — | — |
| Comparative Example 5 | 52 | 1.8* | Absent | Present | 8.9* | Present* | — | — |
| Comparative Example 6 | 53 | 5.2 | Absent | Absent | 12.2* | Present* | — | — |
| Comparative Example 7 | 51 | 2.6 | Present* | Present | 2.4 | Absent | — | — |
| Comparative Example 8 | 51 | 2.2 | Absent | Present | 2.8 | Present* | — | — |
| Comparative Example 9 | 55 | 1.8* | Absent | Present | 3.1 | Present* | — | — |
| Conventional Example 1 | 30 | 0 | Absent | Absent | 1.5 | Absent | 3.8 | 3.5 |

*[1]PPI: number of pores per inch (25.4 mm)

As can be understood from Table 5, with regard to the foamed aluminums in Examples 1 to 16, the numbers of pores per skeleton length of 100 μm of the perforated sintered metals were in a range of 2 to 4, and the numbers of three-dimensional pores per one inch were in a range of 52 or more, that is, the numbers of the three-dimensional pores per one centimeter in the metal skeletons were in a range of 20 or more. In addition, no lumps of liquid droplets were generated in the foamed aluminums, the electrical resistances were low, and no cracking due to the winding test was observed. Accordingly, the foamed aluminums in Examples 1 to 16 are suitable as a current collector for a positive electrode of a battery or a capacitor which requires high output and high energy density.

Next, a lithium cobalt oxide (LiCoO$_2$) powder as an active material, polyvinylidene fluoride (PVdE) as a binder, artificial graphite powder as a conductive material were mixed at a ratio by weight of 86:6:8 to prepare a cathode material. N-methyl-2 pyrrolidone as a solvent was mixed with the cathode material to prepare a cathode active material slurry.

Then, the foamed aluminums in Examples 1 to 16 and foamed aluminum in Conventional Example 1 were immersed into this cathode active material slurry for 10 minutes. The foamed aluminums were taken therefrom, and dried. Thereafter, the foamed aluminums were rolled to produce cathodes of lithium-ion batteries in Examples 1 to 16 having thicknesses of 0.5 mm.

Here, as the foamed aluminum in Conventional Example 1, foamed aluminum of 30 PPI was used. The foamed aluminum was produced by a method of pressing aluminum into a casting mold having a core of sponge urethane which is mentioned as the second method in the related art. In addition, the filling densities of the cathode active materials of the foamed aluminum in Examples 1 to 16 and the foamed aluminum in Conventional Example 1 are shown in Table 5.

Then, cylindrical objects having diameters of 1 mm, 1.5 mm, 2 mm, 2.5 mm, 3 mm, 3.5 mm, 4 mm, 4.5 mm, and 5 mm were respectively prepared. The cathodes of lithium-ion batteries in Examples 1 to 16 and Conventional Example 1 were wound. Whether or not the active materials were peeled off was visually observed, and the minimum diameters with which peeling were not observed are shown in Table 5.

As can be understood from the results in Table 5, with regard to the cathodes of the lithium-ion batteries in Examples 1 to 16, the active materials were not peeled off even in the case where the cathodes were wound around the cylindrical objects having diameters of 1.5 mm to 2.5 mm. On the other hand, with regard to the cathode in Conventional Example 1, the active material was peeled off when the cathode was wound around the cylindrical object having a diameter of 3 mm. In addition, the active material filling density of the cathode of the lithium-ion batteries in Examples 1 to 16 were in a range of 4.1 g/cm³ or greater. In contrast, the active material filling density of the cathode in Conventional Example 1 was 3.841 g/cm$^3$, which was small.

INDUSTRIAL APPLICABILITY

The present invention can be applied as a method for producing an aluminum composite in which porous sintered aluminum is integrated onto an aluminum foil or an aluminum plate, and the aluminum composite can be suitably used as current collectors of a lithium-ion secondary battery and an electrical double layer.

BRIEF DESCRIPTION OF REFERENCE SIGNS

1: shape-forming apparatus
3: viscous composition
8: aluminum foil
14: formed object prior to sintering
15: porous sintered aluminum
16: aluminum composite

The invention claimed is:

1. A method for producing an aluminum composite including porous sintered aluminum, the method comprising:
   mixing aluminum powder with a sintering aid powder containing either one or both of titanium and titanium hydride to obtain a raw aluminum mixed powder;
   adding and mixing a water-soluble resin binder, water, a plasticizer containing at least one selected from polyhydric alcohols, ethers, and esters, and a water-insoluble hydrocarbon-based organic solvent containing five to eight carbon atoms into the raw aluminum mixed powder to obtain a viscous composition;
   shape-forming the viscous composition on an aluminum foil or an aluminum plate and causing the viscous composition to foam to obtain a formed object prior to sintering; and
   heating the formed object prior to sintering in a non-oxidizing atmosphere to obtain an aluminum composite which includes porous sintered aluminum integrally joined onto the aluminum foil or the aluminum plate,
   wherein when a temperature at which the raw aluminum mixed powder starts to melt is expressed as Tm (° C.), then a temperature T (° C.) of the heating fulfills Tm-10 (° C.)≤T≤685 (° C.).

2. The method for producing an aluminum composite including porous sintered aluminum according to claim 1, wherein an average particle diameter of the aluminum powder is in a range of 2 to 200 μm.

3. The method for producing an aluminum composite including porous sintered aluminum according to claim 1, wherein when an average particle diameter of the sintering aid powder is expressed as r (μm), and a mixing ratio of the sintering aid powder is expressed as W (% by mass), then r and W fulfill 1 (μm)≤r≤30 (μm), 1 (% by mass)≤W≤20 (% by mass), and 0.1≤W/r≤2.

4. The method for producing an aluminum composite including porous sintered aluminum according to claim 1, wherein the water-soluble resin binder is contained at a content in a range of 0.5% to 7% of a quantity (mass) of the raw aluminum mixed powder.

5. The method for producing an aluminum composite including porous sintered aluminum according to claim 1, wherein surfactant is added to the raw aluminum mixed powder at a content in a range of 0.02 to 3% of a quantity (mass) of the raw aluminum mixed powder.

* * * * *